(12) United States Patent
Kwon et al.

(10) Patent No.: US 11,325,585 B2
(45) Date of Patent: May 10, 2022

(54) CLUTCH CONTROL METHOD FOR HYBRID VEHICLE WITH DUAL CLUTCH TRANSMISSION

(71) Applicants: Hyundai Motor Company, Seoul (KR); Kia Motors Corporation, Seoul (KR)

(72) Inventors: Gi Young Kwon, Seoul (KR); Kyung Hun Hwang, Gyeonggi-do (KR); Kyung Taek Lee, Seoul (KR); Hoon Han, Gyeonggi-do (KR); Hyun Woo Lim, Gyeonggi-do (KR); Dong Jun Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 497 days.

(21) Appl. No.: 16/384,030

(22) Filed: Apr. 15, 2019

(65) Prior Publication Data

US 2020/0164865 A1 May 28, 2020

(30) Foreign Application Priority Data

Nov. 23, 2018 (KR) .......................... 10-2018-0146119

(51) Int. Cl.
*B60W 10/02* (2006.01)
*B60W 20/30* (2016.01)
(Continued)

(52) U.S. Cl.
CPC ............ *B60W 20/30* (2013.01); *B60W 10/02* (2013.01); *B60W 10/113* (2013.01); (Continued)

(58) Field of Classification Search
CPC .... B60W 20/30; B60W 10/02; B60W 10/113; B60W 2540/10; B60W 2540/12; B60W 2540/16; B60W 2552/15; B60W 2710/021; B60W 30/18118; B60W 20/00; B60W 30/181; B60W 50/10; B60W 40/076; B60W 2530/18; B60W 2710/022; F16D 48/064; F16D 2500/102; F16D 2500/10412; F16D 2500/1045; F16D 2500/30806;
(Continued)

(56) References Cited

U.S. PATENT DOCUMENTS 8,364,364 B1    1/2013   Tao et al.
8,930,103 B2    1/2015   Faust
(Continued)

FOREIGN PATENT DOCUMENTS

KR     20150138761 A    12/2015

*Primary Examiner* — David J Hlavka
(74) *Attorney, Agent, or Firm* — Mintz Levin Cohn Ferris Glovssky and Popeo, P.C.; Peter F. Corless

(57) ABSTRACT

A clutch control method for a hybrid vehicle with a DCT is provided. The method includes determining an energy-saving possible period based on a selection state of shifting ranges, operation states of an accelerator pedal and a brake pedal, and the gradient of a road on which the vehicle is driven. An operation current is set for maintaining a clutch, which is configured to engage the first gear, engaged as 0 A in response to determining that a current state of the vehicle is in the energy-saving possible period.

14 Claims, 3 Drawing Sheets

(51) Int. Cl.
  *F16D 48/06* (2006.01)
  *B60W 10/113* (2012.01)
(52) U.S. Cl.
  CPC ........ *F16D 48/064* (2013.01); *B60Y 2200/92* (2013.01); *F16D 2500/102* (2013.01); *F16D 2500/1045* (2013.01); *F16D 2500/10412* (2013.01); *F16D 2500/30806* (2013.01); *F16D 2500/3127* (2013.01); *F16D 2500/3144* (2013.01); *F16D 2500/31426* (2013.01); *F16D 2500/70418* (2013.01); *F16D 2500/70424* (2013.01); *F16D 2500/70488* (2013.01)
(58) Field of Classification Search
  CPC ..... F16D 2500/3127; F16D 2500/3144; F16D 2500/31426; F16D 2500/70418; F16D 2500/70488; F16D 2500/70424; F16D 2500/31433; F16D 2500/31453; F16D 2500/3124; F16D 2500/5043; F16D 2500/50224; F16D 2500/5126; B60K 26/021
  See application file for complete search history.

(56) References Cited

U.S. PATENT DOCUMENTS

| | | |
|---|---|---|
| 8,996,266 B2 | 3/2015 | Hultengren et al. |
| 2018/0163855 A1* | 6/2018 | Cho .................... B60W 40/105 |
| 2018/0244284 A1* | 8/2018 | Amano ................ F16H 61/662 |
| 2019/0249728 A1 | 8/2019 | Grosser et al. |
| 2020/0141486 A1* | 5/2020 | Hawley ................... F16H 61/21 |
| 2020/0148208 A1* | 5/2020 | Choi ..................... B60W 10/11 |

\* cited by examiner

CLUTCH CONTROL METHOD FOR HYBRID VEHICLE WITH DUAL CLUTCH TRANSMISSION

CROSS-REFERENCE TO RELATED APPLICATION

This application claims the priority benefit of Korean Patent Application No. 10-2018-0146119, filed on Nov. 23, 2018, the disclosure of which is incorporated herein by reference.

BACKGROUND

1. Field of the Disclosure

The present disclosure relates to a clutch control method for a hybrid vehicle with a Dual Clutch Transmission (DCT), and more particularly, to a clutch control method for a hybrid vehicle with a DCT that secures high acceleration responsiveness and minimizes reduction of fuel efficiency and traveling distance.

2. Description of the Prior Art

A DCT receives power through two input shafts connected to two clutches and engages odd-numbered gear stages and even-numbered gear stages of a series of gear stages from a first gear to an N-th gear through the input shafts, respectively, to thus divide the two input shafts into an odd-numbered input shaft and an even-numbered input shaft. Accordingly, the two clutches are also capable of being divided into an odd-numbered clutch connected to the odd-numbered input shaft and an even-numbered clutch connected to the even-numbered input shaft.

The two clutches of the DCT are operated by clutch actuators that are driven by electricity and the clutch actuators may also be divided into an even-numbered clutch actuator and an odd-numbered clutch actuator. When a driver intends to accelerate after a hybrid vehicle with a DCT is stopped, the odd-numbered clutch is operated to be maintained engaged, with a first gear engaged to achieve high acceleration responsiveness of the vehicle. However, this decreases the fuel efficiency and the traveling distance of the hybrid vehicle by continuously applying an operation current to the odd-numbered clutch actuator to maintain the odd-numbered clutch engaged, as described above.

The description provided above as a related art of the present disclosure is merely for helping understanding the background of the present disclosure and should not be construed as being included in the related art known by those skilled in the art.

SUMMARY

The present disclosure provides a clutch control method and system for a hybrid vehicle with a DCT, the method being able to secure high acceleration responsiveness of a hybrid vehicle with a DCT when a driver intends to accelerate after the vehicle is stopped, and being able to minimize reduction of fuel efficiency and traveling distance by minimizing power consumption as much possible.

In view of the above aspect, a clutch control method for a hybrid vehicle with a DCT according to the present disclosure may include: detecting, by a controller, whether a current shifting range is a drive (D)-range; detecting, by the controller, the gradient of a road on which the vehicle is driven and a driver's stop requirement; and stopping, by the controller, an operation current that is supplied to a clutch actuator of a clutch transmitting power to a first gear when determining that the current shifting range is a D-range, the gradient of a road does not require uphill driving, and a driver's stop requirement is detected.

The controller may be configured to determine that the gradient of a road on which the vehicle is driven is a gradient that requires uphill driving when a signal value of an inclination angle sensor is greater than a predetermined first reference inclination angle. Additionally, the controller may be configured to determine that the gradient is a gradient that requires flat-ground driving when the signal value is equal to or less than the first reference inclination angle and is a second reference inclination angle or greater, and determine that the gradient is a gradient that requires downhill driving when the signal value is less than the second reference inclination angle.

When an accelerator pedal depression extent (e.g., engagement amount) by a driver is a predetermined reference acceleration extent or less and a brake pedal depression extent is a predetermined braking extent or greater, the controller may be configured to determine that there is a driver's stop requirement. The clutch actuator of the clutch transmitting power to a first gear may be an odd-numbered clutch actuator.

In view of the above aspect, a clutch control method for a hybrid vehicle with a DCT according to the present disclosure may include: determining, by the controller, an energy-saving possible period based on a selection state of shifting ranges, operation states of an accelerator pedal and a brake pedal by a driver, and the gradient of a road; and setting, by the controller, an operation current for maintaining a clutch, which is configured to engage the first gear, engaged as 0 A when determining that a current state of the vehicle is in the energy-saving possible period.

The controller may be configured to determine an operation state of an accelerator pedal by a driver based on a signal from an accelerator pedal sensor (APS), determine an operation state of a brake pedal by the driver based on a signal from a brake pedal sensor (BPS), and determine the gradient of a road based on a signal from an inclination angle sensor. The controller may be configured to determine whether there is a driver's stop requirement based on the APS signal and the BPS signal.

Additionally, the controller may be configured to determine that there is a driver's stop requirement when the APS signal is a reference acceleration extent or less and the BPS signal is a reference braking extent or greater. The controller may be configured to detect the energy-saving possible period in response to determining that a shifting range is a D-range, there is a driver's stop requirement, and the vehicle is not on an uphill road. The controller may additionally be configured to detect the energy-saving possible period when a vehicle speed is 0 mph in further consideration of the vehicle speed other than the shifting range, the driver's stop requirement, and the gradient of a road.

According to the present disclosure, it may be possible to secure high acceleration responsiveness of a hybrid vehicle with a DCT when a driver intends to accelerate after the vehicle is stopped, and to minimize reduction of fuel efficiency and traveling distance by minimizing power consumption as much possible.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
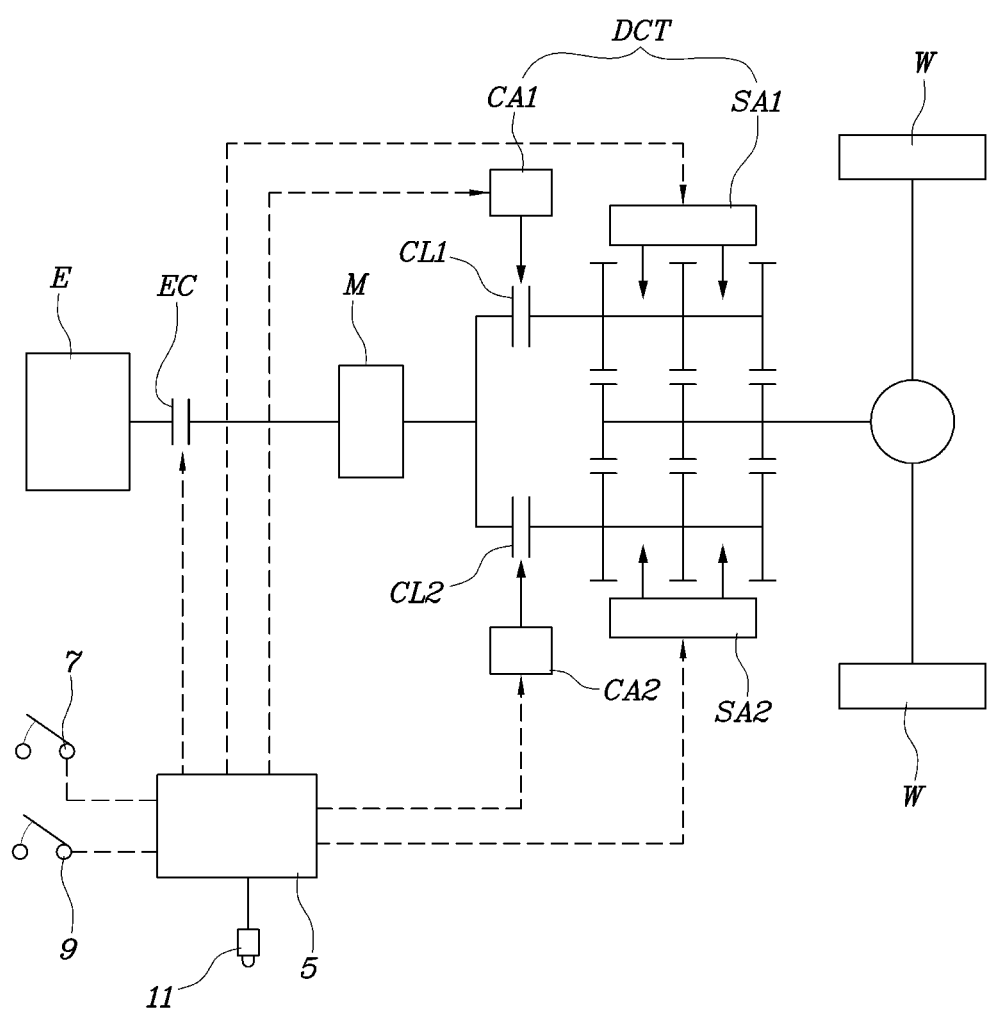
FIG. 1 is a view showing the configuration of a hybrid vehicle with a DCT according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIG. 1, power from an engine E may be provided to driving wheels W through a dual clutch transmission (DCT), an odd-numbered clutch CL1 and an even-numbered clutch CL2 which are two clutches of the DCT may be operated by an odd-numbered clutch actuator CA1 and an even-numbered clutch actuator CA2, respectively, gears of gear stages may be engaged by shifting actuators SA1 and SA2 that selectively drive synchronizers, and the actuators may be operated by a controller 5. The controller may be connected to an accelerator position sensor (APS) 7 configured to receive an accelerator pedal depression extent (e.g., engagement amount, force exerted onto the pedal, etc.), a brake pedal sensor (BPS) 9 configured to receive a brake pedal depression extent (e.g., engagement amount, force exerted onto the pedal, etc.), and an inclination angle sensor 11 configured to measure the gradient of a road surface on which a vehicle is being driven. A motor M may be connected to an input shaft of the DCT and may be connected to the engine E via an engine clutch EC, thereby configuring a hybrid powertrain. The controller 5 may be configured to receive information such as the selection state of shifting ranges, engine torque, and the engine speed.

Figure 2:
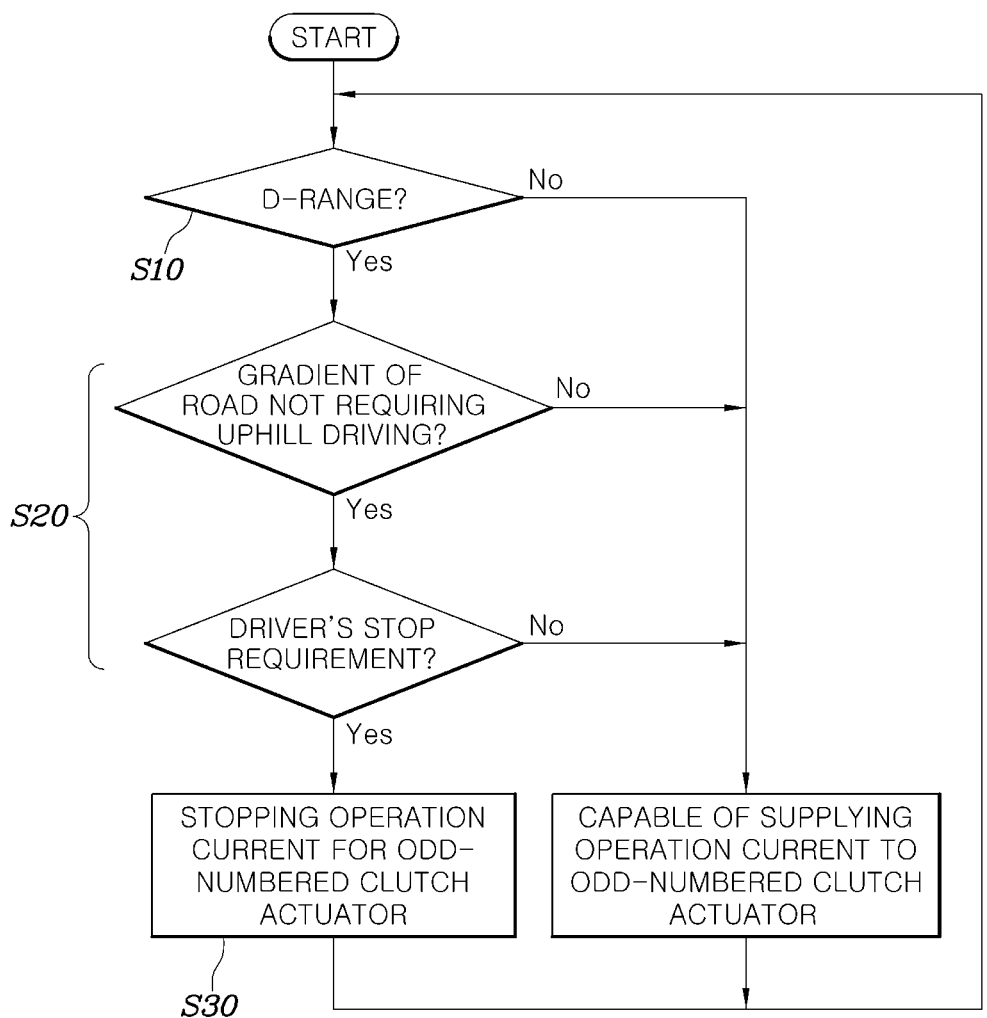
FIG. 2 is a flowchart showing a clutch control method for a hybrid vehicle with a DCT according to an exemplary embodiment of the present disclosure.

Referring to FIG. 2, an exemplary embodiment of a clutch control method for a hybrid vehicle with a DCT may include: detecting, by the controller, whether the current shifting range is a drive (D)-range (S10); detecting, by the controller, the gradient of a road on which the vehicle is driven and a driver's stop requirement (e.g., deceleration intention or input) (S20); and stopping, by the controller, an operation current that is supplied to a clutch actuator of a clutch that transmits power to a first gear in response to determining that the current shifting range is a D-range, the gradient of a road does not require uphill driving (e.g., the mad is not inclined), and a driver's stop requirement is detected (S30).

In other words, when a vehicle is not driven on an uphill road and the vehicle is stopped at the first gear of the D-range by a requirement or input for stopping the vehicle by a driver in general consideration of a shifting range, the gradient of a road, and a driver's stop requirement, an operation current is not supplied to a clutch actuator (hereafter, an odd-numbered clutch actuator) that transmits power to the first gear, thereby preventing unnecessary power consumption. Further, when those conditions are not satisfied, an operation current may be supplied to the odd-numbered clutch actuator as in the related art to provide rapid responsiveness to driver's acceleration requirement.

When the conditions are not satisfied and an operation current is continuously supplied to the odd-numbered clutch actuator may refer to when a driver requires acceleration, both feet are used to simultaneously operate an accelerator pedal and a brake pedal, or creeping is performed without both of the accelerator pedal and brake pedal operated, and, in these cases, rapid responsiveness based on the driver's acceleration requirement may be secured. Therefore, according to the present disclosure, it may be possible to improve the fuel efficiency and traveling distance of a vehicle by reducing power consumption of a hybrid vehicle and to provide rapid acceleration responsiveness when the vehicle is reaccelerated after being stopped, thereby being able to maximize the commercial value of the vehicle.

Moreover, the controller may be configured to determine that the gradient of a road on which the vehicle is being driven is a gradient that requires uphill driving (e.g., in response to determining the mad is inclined) when a signal value of the inclination angle sensor is greater than a predetermined first reference inclination angle, determine that the gradient is a gradient that requires flat-ground driving when the signal value is the first reference inclination angle or less and is a second reference inclination angle or greater, and determine that the gradient is a gradient that requires downhill driving when the signal value is less than the second reference inclination angle. Accordingly, by determining a current gradient of the mad, the controller may be configured to determine whether the mad is inclined or substantially flat. In particular, based on the driving direction of the vehicle, the controller may be configured to distinguish uphill or downhill driving when the mad is determined to be an inclined road.

In other words, when the first reference inclination angle is greater than the second reference inclination angle, and when the signal value of the inclination angle sensor is less than the first reference inclination angle, the controller may be configured to determine that the road gradient condition for stopping an operation current for the odd-numbered clutch actuator is satisfied. The first reference inclination angle and the second reference inclination angle may be set in design to satisfy the intent of the present disclosure through experiments and analysis in accordance with the characteristics of an inclination angle sensor.

When the accelerator pedal depression extent by a driver is a predetermined reference acceleration extent or less (e.g., is equal to or less than a predetermined engagement amount or an amount of force exerted onto the pedal) and the brake pedal depression extent is a predetermined braking extent or greater (e.g., is equal to or greater than a predetermined engagement amount or an amount of force exerted onto the pedal), the controller may be configured to detect a driver's stop intention or input (e.g., a driver's stop requirement). The controller may be configured to determine the operation state of the accelerator pedal by a driver based on a signal from the APS, determine the operation state of the brake pedal by the driver based on a signal from the BPS, and determine the gradient of a road based on a signal from the inclination angle sensor. Further, the controller may be configured to determine whether there is a driver's stop requirement based on the APS signal and the BPS signal.

Accordingly, when the APS signal is the reference acceleration extent or less and the BPS signal is the reference braking extent or greater, the controller may be configured to detect a driver's stop requirement. The reference acceleration extent and the reference braking extent may be appropriately set, for example, to about 5% and 30%, respectively, through experiments and analysis according to the characteristics of the sensor so that the driver's stop requirement may be definitely checked in consideration of errors etc. of the APS or the BPS.

Figure 3:
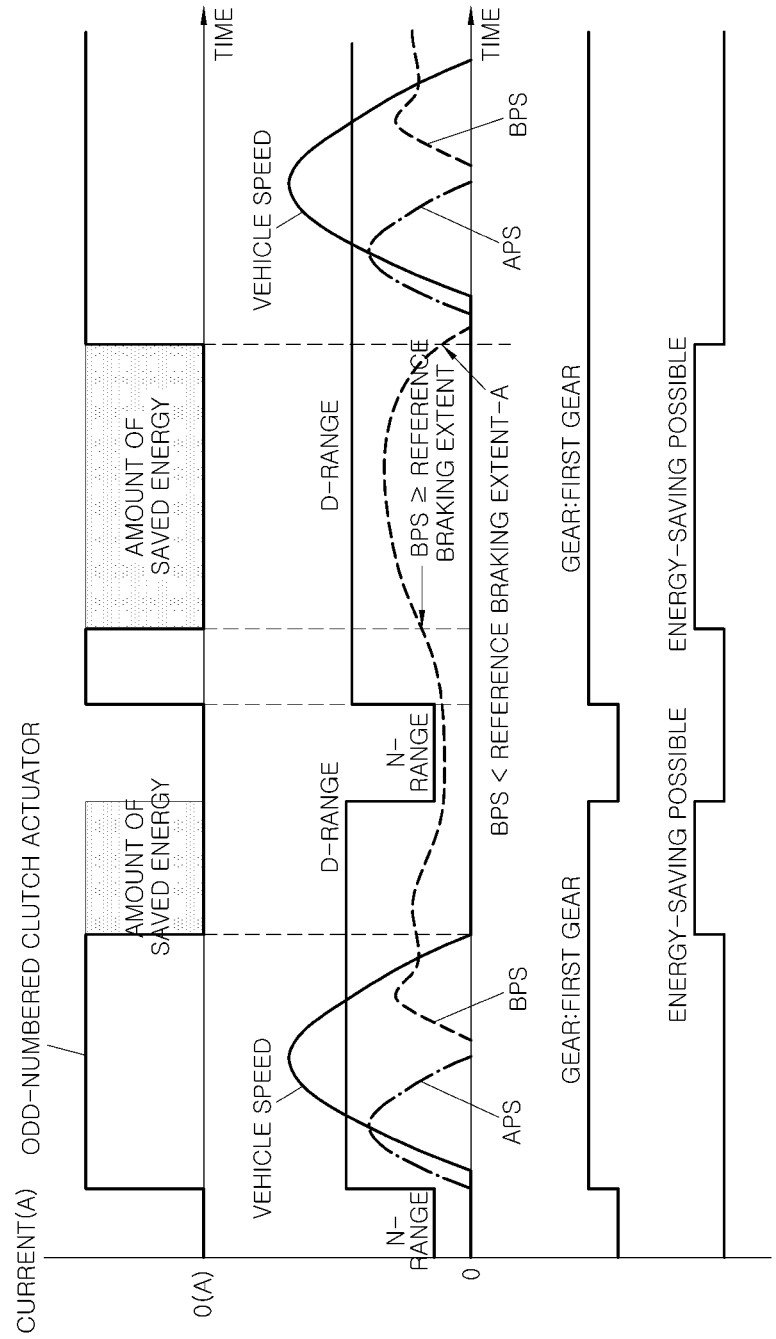
FIG. 3 is a graph showing the clutch control method for a hybrid vehicle with a DCT according to an exemplary embodiment of the present disclosure.

For reference, in FIG. 3 showing an application example of the present disclosure, when the APS signal is 0 and the BPS signal is the reference braking extent or greater, the controller may be configured to detect a driver's stop requirement and stop the operation current that is supplied to the odd-numbered clutch actuator, thereby saving energy. Further, when the BPS signal becomes less than the reference braking extent (A), the controller may be configured to determine that the driver's stop requirement does not continue and start to supply the operation current to the odd-numbered clutch actuator, thereby preparing to be able to immediately respond to a new driver's acceleration requirement. In other words, when the engagement of the brake pedal is no longer detected, the controller may be configured to supply the operation current to the od-numbered clutch actuator.

Further, A is a value for securing control stability by preventing frequency control variations by forming hysteresis and may be appropriately set in design in consideration of an error and resolution of the BPS. Although the clutch actuator of the clutch for transmitting power to the first gear is described above as an odd-numbered clutch actuator, it is not limited thereto and refers to a clutch actuator installed to operate the clutch connected to the input shaft to engage the first gear of the DCT.

The present disclosure may include: determining an energy-saving possible period based on the selection state of shifting ranges, the operation states of an accelerator pedal and a brake pedal by a driver, and the gradient of a road by a controller; and setting an operation current for maintaining a clutch, which is configured to engage the first gear, engaged as 0 A in response to determining that the current state of a vehicle is in the energy-saving possible period.

Particularly, when determining that the shifting range is the D-range, a driver's stop requirement, and that the vehicle is not on an uphill road (e.g., the road is flat), the controller may be configured to determine an energy-saving possible period. In other words, the energy-saving possible period may be a period of time in which conditions regarding a shifting range for preventing unnecessary power consumption by reducing the operation current supplied to the odd-numbered clutch actuator to 0 A, the gradient of a road, and a driver's stop requirement are all satisfied.

Additionally, the controller may be configured to detect the energy-saving possible period when the vehicle speed is 0 mph in further consideration of the vehicle speed other than the shifting range, the driver's stop requirement, and the gradient of a road, to enable a more stable control by further detecting whether the vehicle speed is 0 mph even through the conditions such as the shifting range, the accelerator pedal depression extent, the brake pedal depression extent, and the gradient of a road described above are all satisfied.

Although the present disclosure was described with reference to exemplary embodiments shown in the drawings, it is apparent to those skilled in the art that the present disclosure may be changed and modified in various ways without departing from the scope of the present disclosure, which is described in the following claims.

What is claimed is:

1. A clutch control method for a hybrid vehicle with a dual clutch transmission (DCT), comprising:
   detecting, by a controller, whether a current shifting range is a drive (D)-range;
   detecting, by the controller, a gradient of a road on which the vehicle is driven and a driver's stop requirement; and
   stopping, by the controller, an operation current that is supplied to a clutch actuator of a clutch that transmits power to a first gear in response to determining that a current shifting range is the D-range, that the gradient of the road does not require uphill driving, and detecting a driver's stop requirement.

2. The method of claim 1, further comprising:
   determining, by the controller, that the gradient of the road on which the vehicle is driven is a gradient that requires uphill driving when a signal value of an inclination angle sensor is greater than a predetermined first reference inclination angle;

determining, by the controller, that the gradient is a gradient that requires flat-ground driving when the signal value is the first reference inclination angle or less and is a second reference inclination angle or greater; and determining, by the controller, that the gradient is a gradient that requires downhill driving when the signal value is less than the second reference inclination angle.

3. The method of claim 1, further comprising:
detecting, by the controller, the driver's stop requirement when an accelerator pedal depression extent by a driver is a predetermined reference acceleration extent or less and a brake pedal depression extent is a predetermined braking extent or greater.

4. The method of claim 1, wherein the clutch actuator of the clutch that transmits power to the first gear is an odd-numbered clutch actuator.

5. A clutch control method for a hybrid vehicle with a dual clutch transmission (DCT), comprising:
detecting, by a controller, an energy-saving possible period based on a selection state of shifting ranges, operation states of an accelerator pedal and a brake pedal, and a gradient of a road; and
setting, by the controller, an operation current for maintaining a clutch, which is configured to engage a first gear, as zero amperes in response to determining that a current state of the vehicle is in the energy-saving possible period.

6. The method of claim 5, further comprising:
determining, by the controller, an operation state of an accelerator pedal based on a signal from an accelerator pedal sensor (APS);
determining, by the controller, an operation state of a brake pedal based on a signal from a brake pedal sensor (BPS); and
determining, by the controller, the gradient of the road based on a signal from an inclination angle sensor.

7. The method of claim 6, further comprising:
detecting, by the controller, a driver's stop requirement based on the APS signal and the BPS signal.

8. The method of claim 7, further comprising:
detecting, by the controller, a driver's stop requirement when the APS signal is a reference acceleration extent or less and the BPS signal is a reference braking extent or greater.

9. The method of claim 8, further comprising:
detecting, by the controller, the energy-saving possible period in response to determining that a shifting range is a drive (D)-range, that the vehicle is not on an uphill road, and detecting the driver's stop requirement.

10. The method of claim 9, further comprising:
detecting, by the controller, the energy-saving possible period when a vehicle speed is zero miles per hour in in addition to the shifting range, the driver's stop requirement, and the gradient of the road.

11. A clutch control system for a hybrid vehicle with a dual clutch transmission (DCT), comprising:
a memory configured to store program instructions; and
a processor configured to execute the program instructions, the program instructions when executed configured to:
detect whether a current shifting range is a drive (D)-range;
detect a gradient of a road on which the vehicle is driven and a driver's stop requirement; and
stop an operation current that is supplied to a clutch actuator of a clutch that transmits power to a first gear in response to determining that a current shifting range is the D-range, that the gradient of the road does not require uphill driving, and detecting a driver's stop requirement.

12. The clutch control system of claim 11, wherein the program instructions when executed are further configured to:
determine that the gradient of the road on which the vehicle is driven is a gradient that requires uphill driving when a signal value of an inclination angle sensor is greater than a predetermined first reference inclination angle;
determine that the gradient is a gradient that requires flat-ground driving when the signal value is the first reference inclination angle or less and is a second reference inclination angle or greater; and
determine that the gradient is a gradient that requires downhill driving when the signal value is less than the second reference inclination angle.

13. The clutch control system of claim 11, wherein the program instructions when executed are further configured to:
detect the driver's stop requirement when an accelerator pedal depression extent by a driver is a predetermined reference acceleration extent or less and a brake pedal depression extent is a predetermined braking extent or greater.

14. The clutch control system of claim 11, wherein the clutch actuator of the clutch that transmits power to the first gear is an odd-numbered clutch actuator.

* * * * *